Dec. 14, 1954  L. R. HEIM  2,696,841
SWEEPSTICK WITH RESILIENT BEARING AND MEANS
TO PREVENT SPLITTING OF OUTER MEMBER
Filed Sept. 11, 1950  3 Sheets-Sheet 1
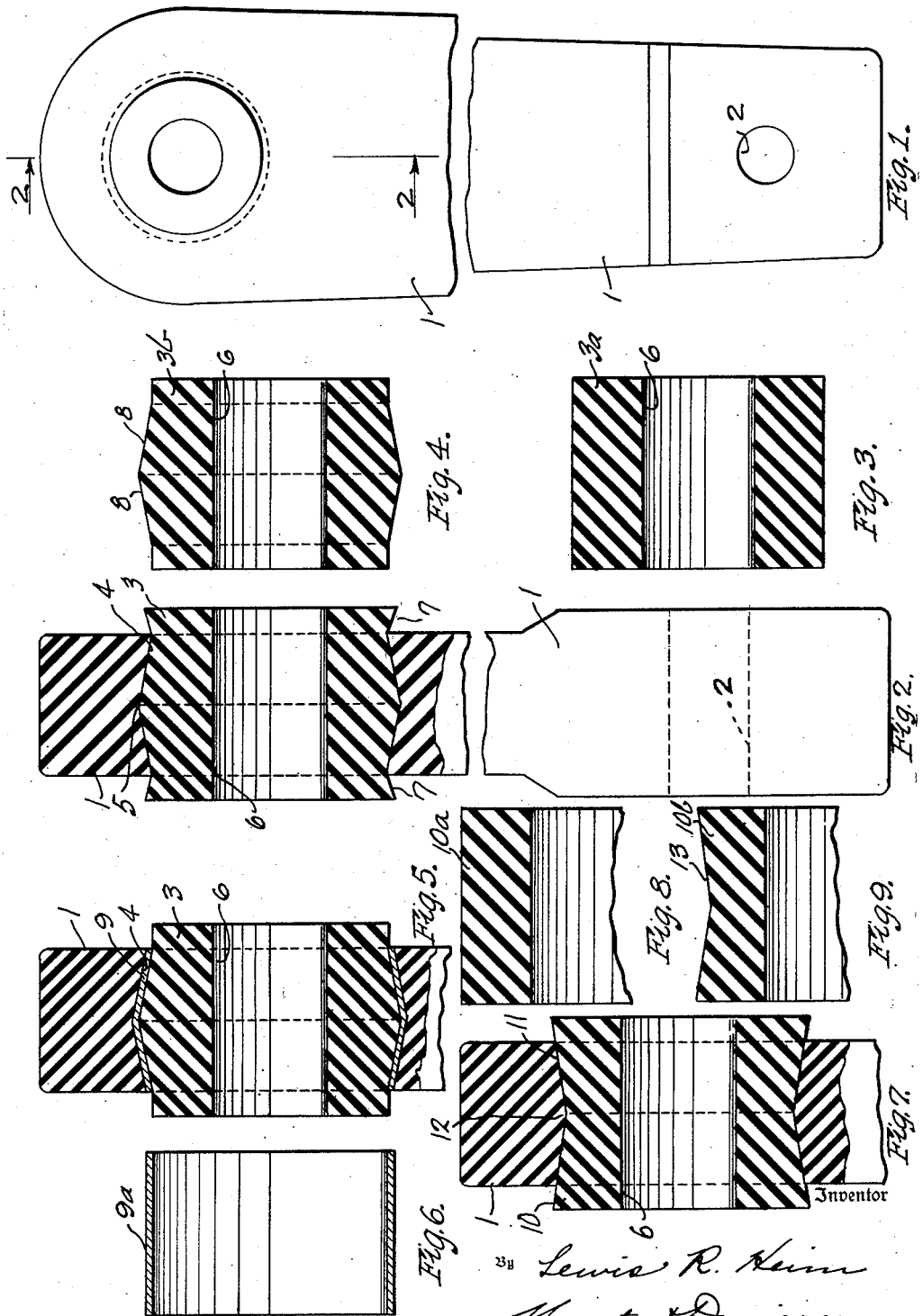

Dec. 14, 1954 — L. R. HEIM — 2,696,841
SWEEPSTICK WITH RESILIENT BEARING AND MEANS TO PREVENT SPLITTING OF OUTER MEMBER
Filed Sept. 11, 1950 — 3 Sheets-Sheet 2
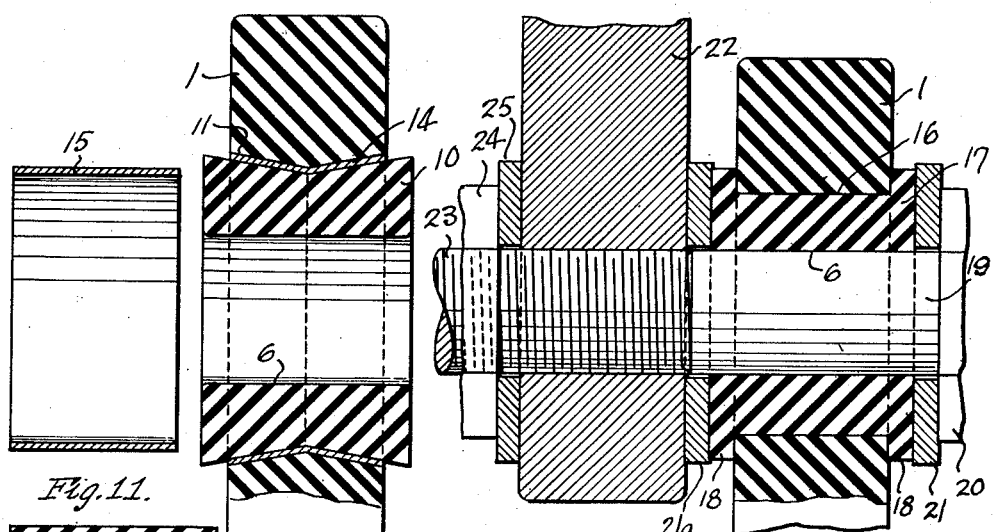
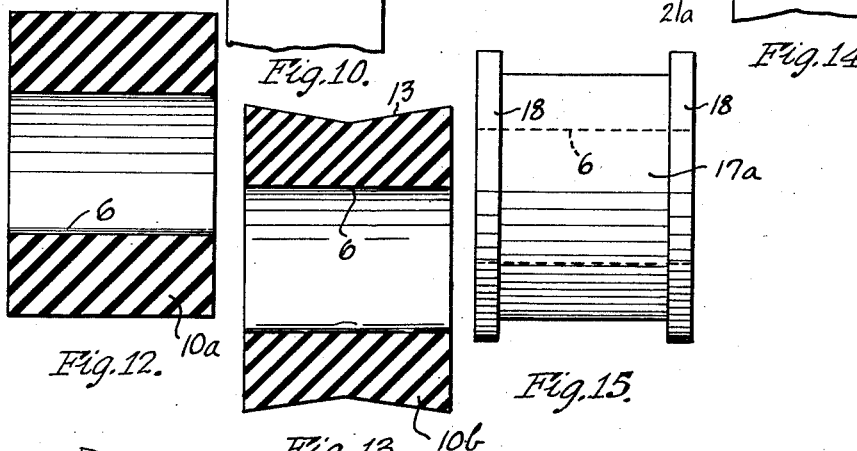
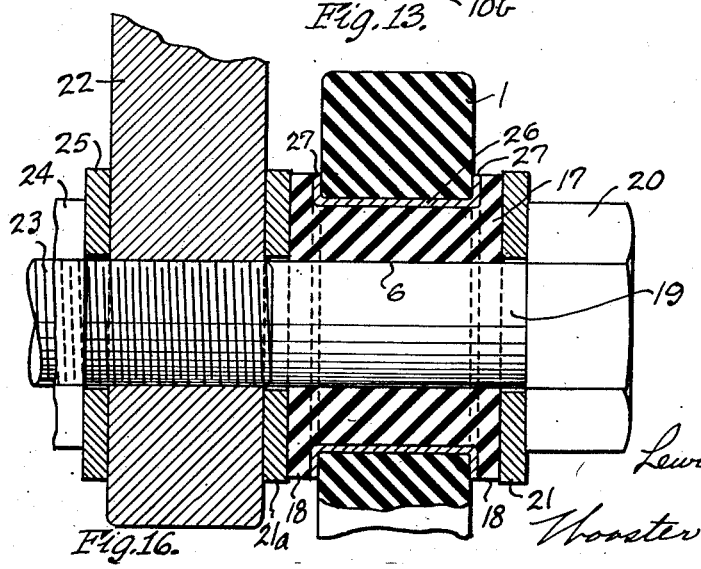
Inventor
Lewis R. Heim
Wooster & Davis  Attorneys Dec. 14, 1954
L. R. HEIM
2,696,841
SWEEPSTICK WITH RESILIENT BEARING AND MEANS
TO PREVENT SPLITTING OF OUTER MEMBER
Filed Sept. 11, 1950
3 Sheets-Sheet 3
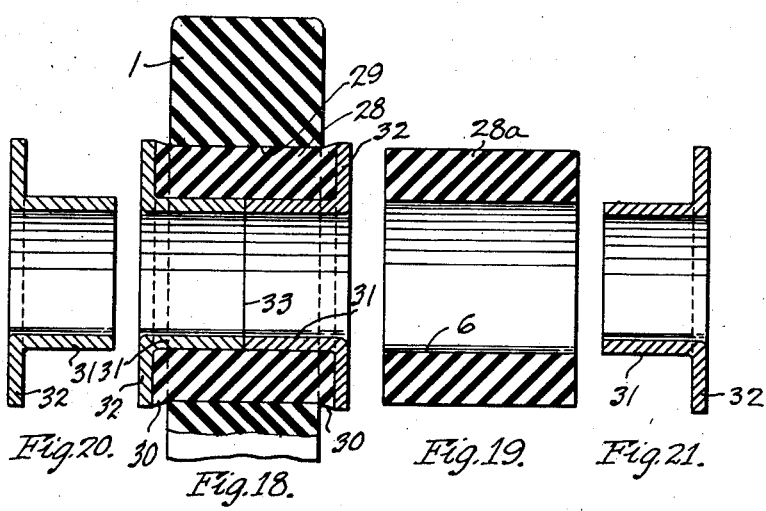
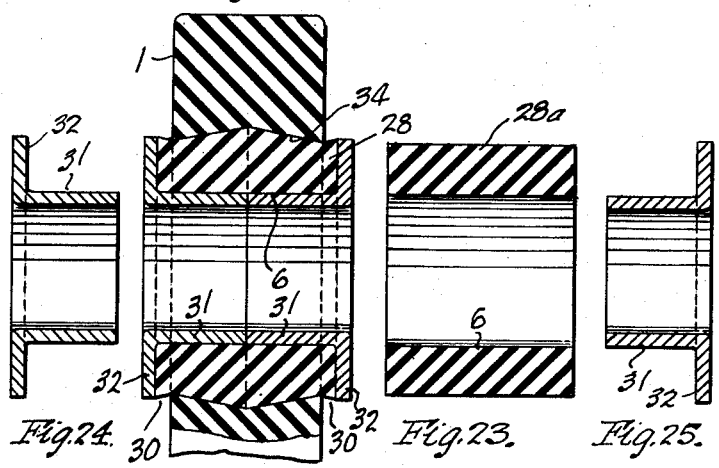
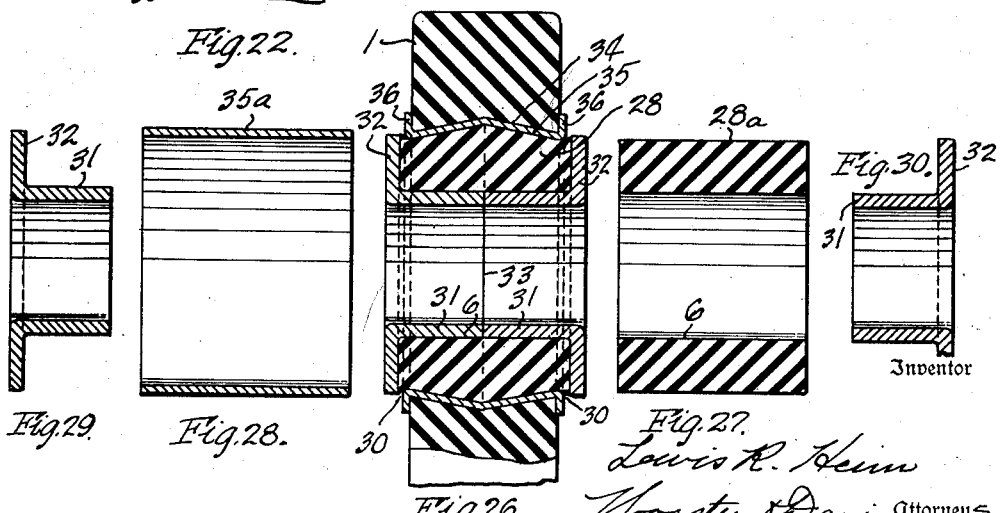
Inventor
Lewis R. Heim
Wooster & Davis Attorneys

United States Patent Office 2,696,841
Patented Dec. 14, 1954

2,696,841

SWEEPSTICK WITH RESILIENT BEARING AND MEANS TO PREVENT SPLITTING OF OUTER MEMBER

Lewis R. Heim, Fairfield, Conn., assignor to The Heim Company, Fairfield, Conn., a corporation of Connecticut Application September 11, 1950, Serial No. 184,141

4 Claims. (Cl. 139—151)

This invention relates to sweepsticks for use in looms and the like, and has for an object to provide a sweepstick with a new and improved bearing to compensate for misalignment of the sweepstick with other elements to which it may be connected, and which bearing is also so constructed as to prevent splitting of the outer member or body of the sweepstick.

A sweepstick is used in mechanism of a loom which forces the shuttle back and forth through the shed. This operation involves a considerable shock to the mechanism which is repeated in every operation of the shuttle. It is desirable to provide this mechanism with sufficient flexibility, yielding and resiliency which will absorb much of the shock incident to the operation of the shuttle and operating mechanism to thus eliminate as far as possible breakage of the parts and reduce wear. It is also desirable to have a bearing in the sweepstick capable of compensating for misalignment without champing or binding. A certain amount of flexibility, yielding and resiliency has been secured by making either the whole body of the sweepstick or at least a portion of it of a flexible, resilient, yielding shock-absorbing material, such, for example, as vulcanized rubber or other suitable plastic, or vulcanized rubber or other suitable plastic in which is embedded and vulcanized layers of fabric such, for example, as canvas.

The present construction of bearing could be used in sweepsticks made of such materials to complement the resiliency and shock-absorbing characteristics of these sweepsticks, and it can further be used in sweepsticks made of more rigid materials, but still resilient and shock-absorbing, such, for example, as wood, plastic, laminated wood, or laminated rubber and fabric, or laminated fabric and rosin, and any similar materials, to provide resiliency and a cushioning effect for absorbing shock forces and compensating for misalignment, and also to prevent splitting of sweepsticks and deterioration of the materials of which they are made, by these forces incident to use of the device in operating mechanism.

It has been found in practice that with the usual type of bearing mounted in these sweepsticks there is a tendency for the repeated shocks and strains incident to the operation of these devices transmitted between the body and the bearing, to split the body of the sweepstick and cause it to deteriorate and thus fail. It is therefore another and important object of this invention to provide a bearing structure which will greatly reduce the tendency or liability of the body member of the sweepstick to split or deteriorate and will also hold this body from splitting.

It is a further object to provide in these sweepstick bodies an improved bearing which is also capable of a certain amount of lateral rocking movement to compensate for misalignment of the sweepstick with the other members of the mechanism with which it is connected.

This construction effectively absorbs both longitudinal and lateral shocks and also compensates for misalignment without binding or cramping effect. This improved construction further greatly increases the life, not only of the sweepstick itself, but also of the connected mechanism with which it is used, and gives improved operation of the device, as well as greatly increasing its operative life and efficiency.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In these drawings:

Fig. 1 is a side elevation of a sweepstick including one form of improved bearing;

Fig. 2 is a partial longitudinal section and partial side elevation, the section being substantially on line 2—2 of Fig. 1, and this figure being also on a larger scale;

Figs. 3 and 4 are longitudinal sections of resilient rubber blocks which may be mounted in the sweepstick for the bearing;

Fig. 5 is a section similar to the upper part of Fig. 2 showing a modified construction;

Fig. 6 is a section of a bushing which may be used in the form of Fig. 5;

Fig. 7 is a section similar to Fig. 5 showing a further somewhat modified construction;

Figs. 8 and 9 are longitudinal sections through one side of the bearing blocks which may be used in the form of Fig. 7;

Fig. 10 is a section similar to Figs. 2, 5 and 7 showing another modified construction;

Fig. 11 is a bushing which may be used with the form of Fig. 10;

Figs. 12 and 13 are sections of bearing blocks which may be used in the construction of Fig. 10;

Fig. 14 is a section of a connecting bearing between the sweepstick and an element connected to and extending from the sweepstick to the mechanism with which it is used and showing still another modified form of bearing in the sweepstick;

Fig. 15 is a side elevation of a bearing block which may be used with the arrangement of Fig. 14;

Fig. 16 is a section similar to Fig. 14 showing another modified arrangement;

Fig. 17 is a partial section and partial side elevation of a bushing which may be used in the form of Fig. 16;

Fig. 18 is a section through another modified form of bearing for the sweepstick;

Figs. 19, 20 and 21 are longitudinal sections of the elements of the bearing of Fig. 18;

Fig. 22 is a section showing another modified form of bearing;

Figs. 23, 24 and 25 are sections of the elements of the bearing of Fig. 22;

Fig. 26 is a section of still another modified form of bearing, and

Figs. 27, 28, 29 and 30 are longitudinal sections of the elements of the bearing of Fig. 26.

Referring first to Figs. 1 to 4 inclusive, a sweepstick is shown comprising a body member 1 of any suitable cross section, preferably in the form of a substantially rectangular bar, as shown, formed of any suitable material, such, for example, as vulcanized rubber or a suitable plastic, or vulcanized rubber or other suitable plastic in which is embedded and vulcanized layers of fabric, such, for example, as cloth, and also of more rigid materials, such as wood, plastic, laminated wood, or laminated rubber and fabric, or laminated fabric and rosin, and any similar materials. At one end it may have any suitable bearing 2 for connection to the mechanism with which it is used, this bearing in the drawing being merely shown diagrammatically, as a transverse opening through the body.

At its opposite end it is provided with an improved bearing including an element 3 which is capable of absorbing shocks and strains incident to operation of the sweepstick and also capable of permitting lateral rocking movement of the connecting element in the bearing to compensate for misalignment of the sweepstick with the parts to which it is connected. This member 3 is preferably a piece of resilient live rubber molded or otherwise shaped or formed and mounted in a transverse opening 4 in the body 1 of the sweepstick. This may be locked in the opening by various means, but in the form shown in Fig. 2 the opening is tapered in opposite directions from substantially its midline 5. That is, the diameter of the opening increases progressively from its opposite ends to this midline. The block of resilient rubber 3a before mounting in the sweepstick may be a straight or cylindrical block as shown in Fig. 3 provided with a bearing opening 6 through it and is forced into the opening 4 in the sweepstick, the block being larger than this opening and also longer than the thickness of the body of the sweepstick, so that when it is forced into the opening it is squeezed into this opening or compressed to conform to the shape of the opening, and also will project somewhat from the opposite sides of the body 1, as shown at 7 in Fig. 2. It is thus effectively locked in position in the sweepstick. If preferred, the block can be shaped on its outer surface similarly to the shape of the opening 4, as indicated at 8 on the block 3b of Fig. 4, but this block would also be larger than the opening so that it is compressed or squeezed into the opening when it is mounted therein.

In the form of Fig. 5 the bearing 3 is the same as that of Fig. 2 and is mounted in the sweepstick in the same way, except that in this case there is provided a metal bushing 9 which is expanded into the opening 4 in the sweepstick before the block 3a or 3b is inserted to form the bearing member 3. Such a bushing is shown in Fig. 6 as a cylindrical member or bushing 9a which is placed in the opening 4 and then expanded to conform to the shape of this opening by any suitable means, such, for example, as rolling or spinning it into place, and it is thus securely locked in the body 1. As the opening in the bushing is also tapered the bearing block 3 as it is compressed and squeezed into the bushing conforms to the shape of the inner side of the bushing and is securely locked therein. This forms a rigid bushing about the resilient block or bearing member 3 and distributes the shock forces or strains from the connecting mechanism incident to operation of this mechanism uniformly over the surfaces of the opening in the body or bar member 1, reducing to a minimum liability of this member splitting from this action, or the material about the opening deteriorating and failing.

In the form of Fig. 7, the bearing member 10 corresponding to the member 3 is also of soft resilient live rubber, and is mounted the same as in the form of Fig. 2, except that in this case the opening 11 in the body 1 is tapered in the opposite direction from that shown in Fig. 2. That is, the opening is of progressively decreasing diameter from its opposite ends to the midline 12. The resilient block 10a before being inserted in the opening may be straight or substantially cylindrical as shown in Fig. 8, or it could have a shape 13 at its outer surface similar to that of the opening 11, as shown on the block 10b in Fig. 9. In either case, the block is larger than the opening 11 so that it has to be forced into this opening and so is compressed or squeezed to conform to the shape of the opening to effectively lock the bearing member 10 in this opening. It has the longitudinal bearing opening 6 the same as in the other forms.

In the form of the device shown in Fig. 10, the construction and arrangement is the same as that of Fig. 7, except that an oppositely tapered bushing 14 is mounted in the body 1 between the bearing member 10 and the opening 11 in the body. This can be provided by a cylindrical sleeve 15 as shown in Fig. 11 inserted in the opening 11 and then expanded to fit this opening, the same as the bushing 9 of Fig. 5, and then the soft resilient live rubber block 10a or 10b of Figs. 12 and 13 is forced into and compressed in the bushing, the same as is the member 10 in mounting it in opening 11 of Fig. 7.

In Fig. 14 is shown another modification of the bearing and also the connecting member mounted in this bearing. In this case the body 1 of the sweepstick is provided with a straight or cylindrical opening 16 in which is forced and compressed a bearing block 17a, Fig. 15, of soft, live, resilient rubber provided with flanges 18 at its opposite ends. This block is larger than the opening 16 so that as it is forced into this opening it is compressed and squeezed the same as in the other forms, to form the bearing member 17, and the flanges 18 closely engage the outside surfaces of the sweepstick body 1. The block is provided with a cylindrical bearing opening 6 the same as in the other forms. This receives the bearing member, such as the bolt 19 having a noncircular head 20 between which and the outer end of the block 17 is a washer 21. A similar washer 21a is located between the opposite end of the bearing member 17 and a connecting member 22 embracing the bearing member 19 and leading to any element of the mechanism (not shown) with which the sweepstick is used or with which it is connected. The member 22 may impart force to the sweepstick 1 through the connecting bearing member 19. The bearing member 19 may be threaded, as indicated at 23, for a nut 24 for clamping all the elements together, also preferably including a washer 25 at the opposite side of the member 22. As the bearing bolt is drawn up tight the washers 21 and 21a are drawn and clamped tightly against the opposite ends of flanges 18 of the bearing member 17. This bearing member 17 provides a universal resilient connection permitting yielding of the member 19 both longitudinally of the member 1, and relative lateral rocking movement between member 19 and member 1 to compensate for misalignment as well as to absorb shock and other strains.

The form of Fig. 16 is the same as that of Fig. 14 except there is mounted between the bearing member 17 and the body member 1 a metal bushing 26 having outturned flanges 27 closely engaging the opposite sides of the member 1 between this member and the flanges 18 of the member 17. This may be provided by a cylindrical sleeve 26a as shown in Fig. 17 inserted in and tightly fitting the opening 16, and then its outer ends turned outwardly to form flanges 27.

In the form of Fig. 18 the bearing member 28 of soft resilient live rubber is mounted in the straight opening 29 in the body member 1, and may be formed from a cylindrical block 28a larger than the opening and forced into the opening so that it is compressed and squeezed into the opening the same as in the other forms, to lock it in the opening. It is also preferably somewhat longer than the thickness of the member 1 so as to project beyond the opposite sides of this member, as shown at 30 in Fig. 18, and these projecting portions also expand somewhat beyond the sides of the opening 29 to assist in locking the bearing 28 in the opening. In this form there is mounted in the bearing opening 6 a two-piece inner bearing bushing of steel or other suitable material. In the form shown this comprises the two members 31 of Figs. 20 and 21 each having an outer flange 32, the body of each member being inserted in the opening 6 from the opposite ends of the member 28, and they are preferably of somewhat larger diameter than the normal size of this opening so that as they are inserted in the opening they expand it somewhat and have a tight fit in the opening 6. They are of a length so that their inner ends abut, as shown at 33 in Fig. 18, but it is preferred that as the bearing member 19 shown in Figs. 14 and 16 is mounted in this bearing and tightened up, it will have to force the sleeve sections 31 together and compress the member 28 between the flanges 32.

The device shown in Fig. 22 is the same as that of Fig. 18, except that the opening 34 in the sweepstick 1 instead of being a straight opening, as shown at 29 in Fig. 18, is an oppositely tapered opening of progressively increasing diameter from its opposite ends to its midline, and therefore when the bearing member 28 is forced into position and compressed in the opening it will conform to this opening and be securely locked therein. The inner two-piece bearing comprises the elements 31 the same as Fig. 18.

In the form of Fig. 26 the bearing is the same as that of Fig. 22, except that there is a metal bushing 35 inserted in the opening 34 between the walls of this opening and the soft resilient live rubber bearing member 28, this portion having outwardly turned flanges 36 closely engaging the outer sides of the member 1 to assist in locking the bushing and the other elements of the bearing in the member 1. This bushing may be provided by means of a tubular sleeve 35a being inserted in the opening 34 and expanded to correspond with and fit tightly in this opening and then the outer ends turned over to form flanges 36.

In all forms of the device shown, the soft live resilient rubber bearing member 3, 10, 17 and 28 provides a resilient yieldable member which will take and cushion the thrusts, jolts and shock strains incident to operation of the device, and will also permit yielding of the bearing, such, for example, as the bearing connection member 19 which may be used in all forms of the bearing shown, and allow yielding not only longitudinally of the body member 1 of the sweepstick but also allow a certain amount of lateral rocking movement of the member 19, or that is, a relative lateral rocking movement between the connected members 1 and 22 to compensate for misalignment and prevent binding or cramping during operation of the device. The rubber also protects the sweepstick member 1 against splitting or deterioration because of these jolts and shock strains, and this protection against this tendency or liability to cause splitting or deterioration of the member 1 will be further increased by the bushings 9, 14, 26 and 35, as the bushing protects the material surrounding it and also spreads the forces or strains uniformly over the surfaces of the opening. Still further, the flanges at the opposite ends of the bushings 26 and 35 provide additional holding and locking means to prevent the body member 1 from splitting or spreading laterally under these forces. It will be seen that in all forms the soft rubber bearing member is longer than the thickness of the bar or body 1, so that it projects at its opposite ends beyond both side surfaces of the body. Therefore, when the bearing member 19 is tightened up the washers 21 and 21a compress the resilient bearing member longitudinally and cause the projecting end portions to expand at the opposite sides of member 1 to more securely lock the resilient member in the body and hold the bar against splitting. This is also true in the forms of Figs. 18 to 26, the flanges 32 having the same effect as the washers and could be called washers. The washers may or may not be used with these inner members, as desired. The washers including the flanges provide spaced shoulders on the bearing bolt or member 19 between which the resilient rubber member is clamped and compressed longitudinally. The two-piece inner bushing formed by the members 31 in the modification of Figs. 18 to 28 forms a metal bearing immediately surrounding the bearing member 19 between this member and the resilient live rubber bearing member to improve the bearing for the member 19, and they also limit the axial distance between the ends or length of this member or the axial compression of the resilient member, and this will provide the proper mounting or bearing for the bolt or bearing member 19 passing through the assembly.

Having thus set forth the nature of my invention, I claim:

1. A sweepstick of the character described comprising a connecting bar provided with a transverse opening at one end, a bearing in said opening comprising a shaped piece of resilient rubber normally of larger size than the opening so that it is compressed by and closely conforms to the shape of the opening to lock it in position therein, said resilient member being provided with a bearing opening therethrough, and an inner sleeve in said latter opening comprising a pair of members each including a tubular portion extending inwardly from an end of the resilient member and an outwardly extending flange engaging the adjacent end of the resilient member.

2. A sweepstick of the character described comprising a connecting bar provided with a transverse opening at one end, a bearing in said opening comprising a metal bushing closely fitting said opening, a shaped piece of resilient live rubber in the bushing, said resilient member being normally larger than the opening in the bushing and longer than the thickness of the bar so that it is compressed by and closely conforms to the shape of said opening and projects at its opposite ends beyond the side surfaces of the bar to lock said member in position in the bar, said resilient member being provided with a bearing opening therethrough, and an inner sleeve in said latter opening comprising a pair of members each including a tubular portion extending inwardly from an end of the resilient member and an outwardly extending flange engaging the adjacent end of the resilient member.

3. A sweepstick of the character described comprising a connecting bar provided with a transverse opening at one end which tapers in opposite directions from its ends to substantially its midsection, a bearing in said opening comprising a shaped piece of resilient rubber normally of larger size than the opening in the bar and longer than the thickness of the bar so that it is compressed by and closely conforms to the shape of said opening and projects at its opposite ends beyond the side surfaces of the bar to lock said member in position in the bar, said resilient member being provided with a bearing opening therethrough, and an inner sleeve in said latter opening comprising a pair of members each including a tubular portion extending inwardly from an end of the resilient member and an outwardly extending flange engaging the adjacent end of the resilient member.

4. A sweepstick of the character described comprising a connecting bar provided with a transverse opening at one end which tapers in opposite directions from its ends to substantially its midsection, a bearing in said opening comprising a metal bushing closely fitting said opening, a shaped piece of resilient live rubber in the bushing, said resilient member being normally larger than the opening in the bushing and longer than the thickness of the bar so that it is compressed by and closely conforms to the shape of said opening and projects at its opposite ends beyond the side surfaces of the bar to lock said member in position in the bar, said resilient member being provided with a bearing opening therethrough, and an inner sleeve in said latter opening comprising a pair of members each including a tubular portion extending inwardly from an end of the resilient member and an outwardly extending flange engaging the adjacent end of the resilient member.

References Cited in the file of this patent

UNITED STATES PATENTS

| Number | Name | Date |
|---|---|---|
| 1,541,276 | Powell | June 9, 1925 |
| 1,777,965 | Eakins | Oct. 7, 1930 |
| 1,833,002 | Smith | Nov. 24, 1931 |
| 1,871,861 | Rossman | Aug. 16, 1932 |
| 1,954,277 | Zerk | Apr. 10, 1934 |
| 2,247,484 | Early | July 1, 1941 |
| 2,445,745 | Moe | July 20, 1948 |
| 2,580,119 | Meyers | Dec. 25, 1951 |
| 2,598,115 | Dodge | May 27, 1952 |